US008658912B2

(12) United States Patent
Chiu et al.

(10) Patent No.: US 8,658,912 B2
(45) Date of Patent: Feb. 25, 2014

(54) CABLE MANAGEMENT APPARATUS

(75) Inventors: Po-Wen Chiu, New Taipei (TW);
Wen-Hu Lu, Shenzhen (CN);
Zhan-Yang Li, Shenzhen (CN)

(73) Assignees: Hong Fu Jin Precision Industry (ShenZhen) Co., Ltd, Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 282 days.

(21) Appl. No.: 13/180,829
(22) Filed: Jul. 12, 2011

(65) Prior Publication Data

US 2012/0119038 A1    May 17, 2012

(30) Foreign Application Priority Data

Nov. 16, 2010 (CN) .......................... 2010 1 0546499

(51) Int. Cl.
*H02G 3/08* (2006.01)
*H02G 3/04* (2006.01)

(52) U.S. Cl.
USPC ........................... 174/481; 174/68.3; 174/543

(58) Field of Classification Search
USPC ........... 174/50, 480, 481, 488, 486, 489, 491, 174/68.1, 68.3, 72 A–72 C, 500–503, 543; 211/26.2, 87.01, 88.01, 126.1; 248/49, 248/68.1, 53, 27.3, 221.11, 222.51; 312/263, 264, 223.6, 265.2, 265.5, 312/270.1; 361/724, 726, 826, 825; 385/134, 135, 136, 137
See application file for complete search history.

(56) References Cited

U.S. PATENT DOCUMENTS

| 5,024,614 | A | * | 6/1991 | Dola et al. ..................... 439/114 |
| 5,971,508 | A | * | 10/1999 | Deimen et al. ............. 312/223.6 |
| 6,245,998 | B1 | * | 6/2001 | Curry et al. ................. 174/72 A |
| 6,515,227 | B1 | * | 2/2003 | Massey et al. .................. 174/50 |
| 7,097,047 | B2 | * | 8/2006 | Lee et al. ...................... 211/26.2 |
| 7,200,316 | B2 | * | 4/2007 | Giraud et al. ................. 385/135 |
| 7,526,171 | B2 | * | 4/2009 | Caveney et al. ............. 385/135 |
| 7,762,405 | B2 | * | 7/2010 | Vogel et al. ..................... 211/26 |
| 2006/0018622 | A1 | * | 1/2006 | Caveney et al. ............. 385/135 |

* cited by examiner

*Primary Examiner* — Tan Le
(74) *Attorney, Agent, or Firm* — Altis Law Group, Inc.

(57) ABSTRACT

A cable management apparatus includes a securing board and a cable management tray. The securing board has a securing arm extending upward from the securing board. The cable management tray is hung on the securing arm and includes a base and a door rotatably secured to the base. A hook is substantially perpendicular to the base, and a clasping hole is defined in the door. The door is rotatable relative to the base between a first position and a second position. In the first position, the hook is engaged in the clasping hole, the base and the door together define a space, and a cable is received in the space in a direction substantially parallel to the base. In the second position, the hook is removed from the clasping hole, to disengage the cable from the space.

16 Claims, 4 Drawing Sheets

CABLE MANAGEMENT APPARATUS

BACKGROUND

1. Technical Field

The present disclosure relates to cable management apparatuses, and more particularly to a cable management apparatus used in an electronic device.

2. Description of Related Art

Many electronic devices, such as computers, need a plurality of cables. The cables may, include for example, power cables, data cables, communication lines, or keyboard lines. It is therefore desirable to include some type of cable management apparatus, such as a binding accessory, that allows the various cables to be collected together and attached in a position to improve the use of space and the ease of visual examination inside an electronic device. However, the conventional binding accessory is not suited for temporary use in securing cables, and often there is a need to replace or re-route the cables.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
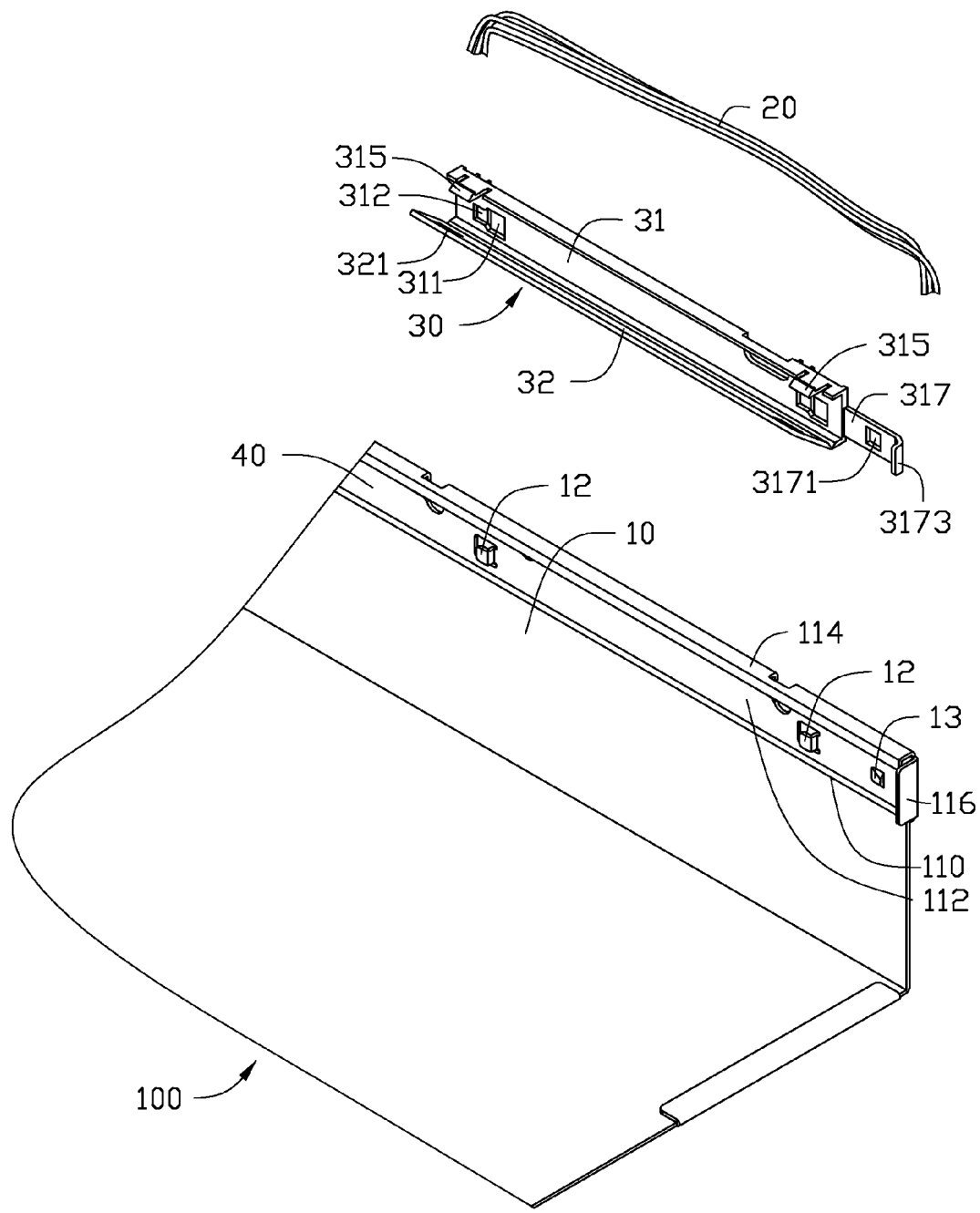
FIG. 1 is an isometric, exploded view of an embodiment of a cable management apparatus.
Figure 2:
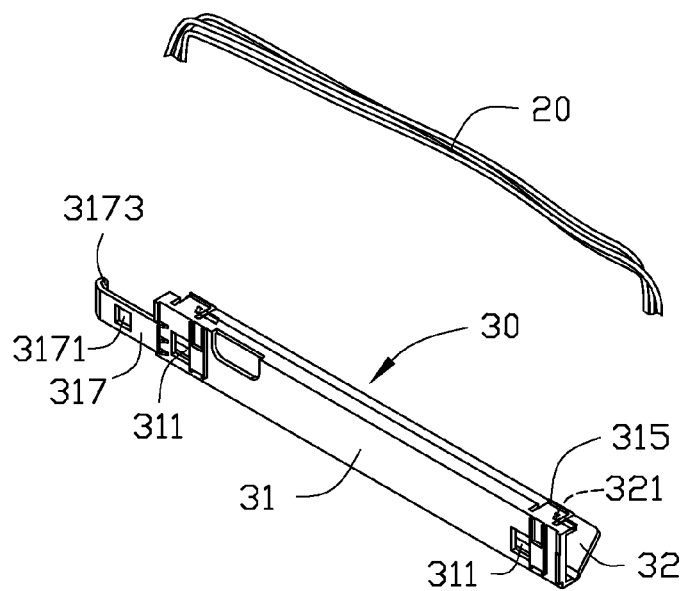
FIG. 2 is similar to FIG. 1, but viewed from another aspect.
Figure 2:
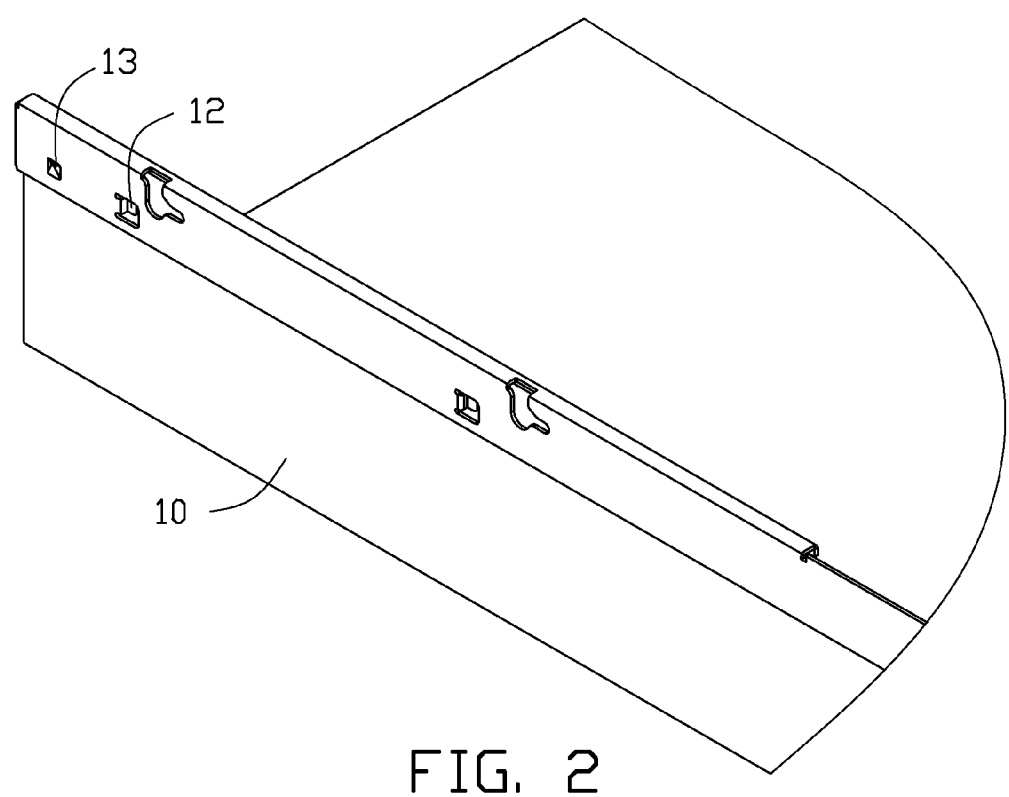

Referring to FIGS. 1 and 2, a cable management apparatus in accordance with an embodiment includes a securing board 10 and a cable management tray 30 mounted to the securing board 10. In one embodiment, the securing board 10 may be a side plate of an electronic device enclosure (enclosure 100), and the cable management tray 30 receives a cable 20.

The securing board 10 has a connecting flange 110 extending outside of the securing board 10, a securing arm 112 connected to the connecting flange 110, a first flange 114 and a second flange 116. The first and second flanges 114, 116 extend from the securing board 110 and towards the inside of the securing board 10. The connecting flange 110, the securing arm 112 and the flange 114 cooperatively define an accommodating space 40 for receiving the cable management tray 30. In one embodiment, the connecting flange 110 is substantially perpendicular to the securing board 10. A block 13 and two clipping pieces 12 are located on the securing arm 112. In one embodiment, the block 13 is adjacent to the second flange 16.

The cable management tray 30 includes a base 31 and a door 32 rotatably mounted to the base 31. In one embodiment, the base 31 is a rectangle plate and has a plane substantially parallel to the securing board 10. Two through holes 311 are defined in the base 31. Two receiving portions 312 are located on the base 31 and each receiving portion 312 communicates with each clipping piece 12. Two hooks 315 extend on the top portion of the base 31 and towards to the door 32. An extending panel 317, with a securing hole 3171, is connected to the base 31. A positioning piece 3173 is connected to the extending panel 317, for abutting the second flange 116. In one embodiment, an extending direction of each of the two hooks 315 is substantially perpendicular to the plane of the base 31. Two clasping holes 321 are defined in the door 32, for receiving the two hooks 315.

The door 32 is rotatable relative to the base 31 between a first position and a second position. In the first position, the two hooks 315 are engaged into the two clasping holes 321, and the door 32 and the base 31 cooperatively define a space 50 for receiving the cable 20. In the second position, the two hooks 315 are removed from the two clasping holes 321, for the cable 20 to be placed in or pulled out of the space 50.

Figure 3:
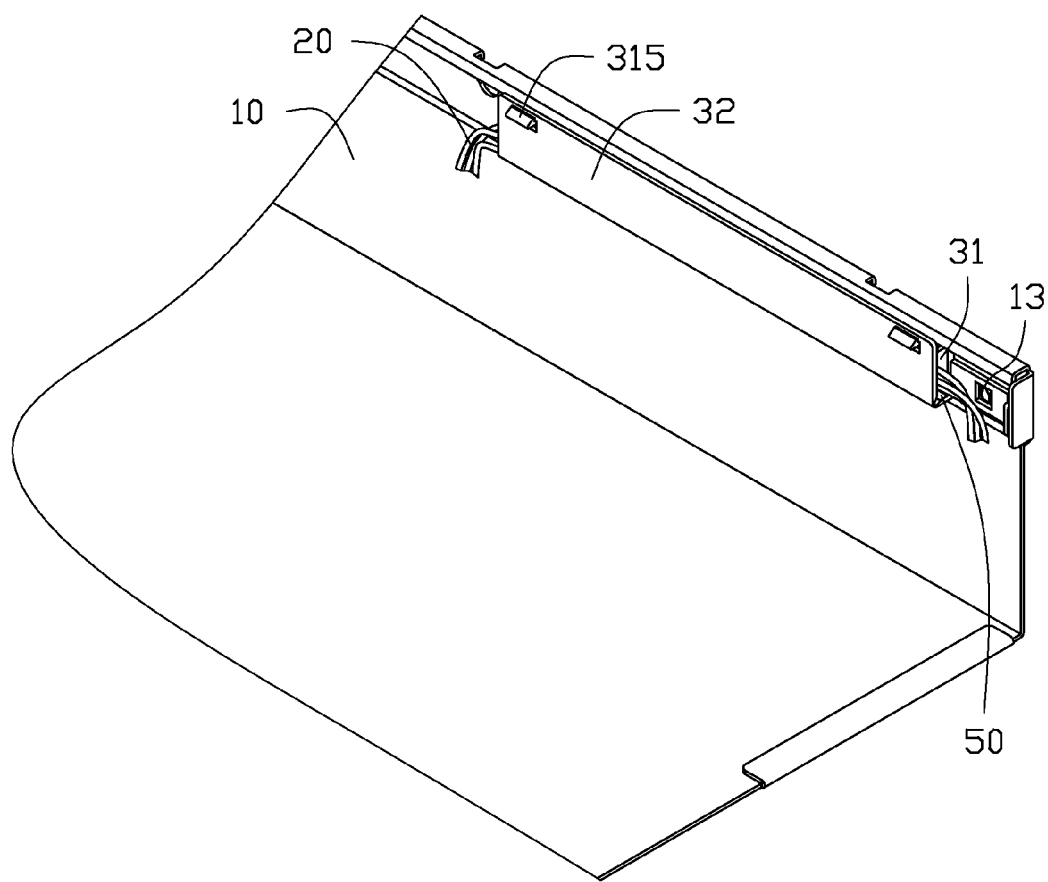
FIG. 3 is an assembled view of FIG. 1, and a cable management tray of the cable management apparatus is located in a first position.
Figure 4:
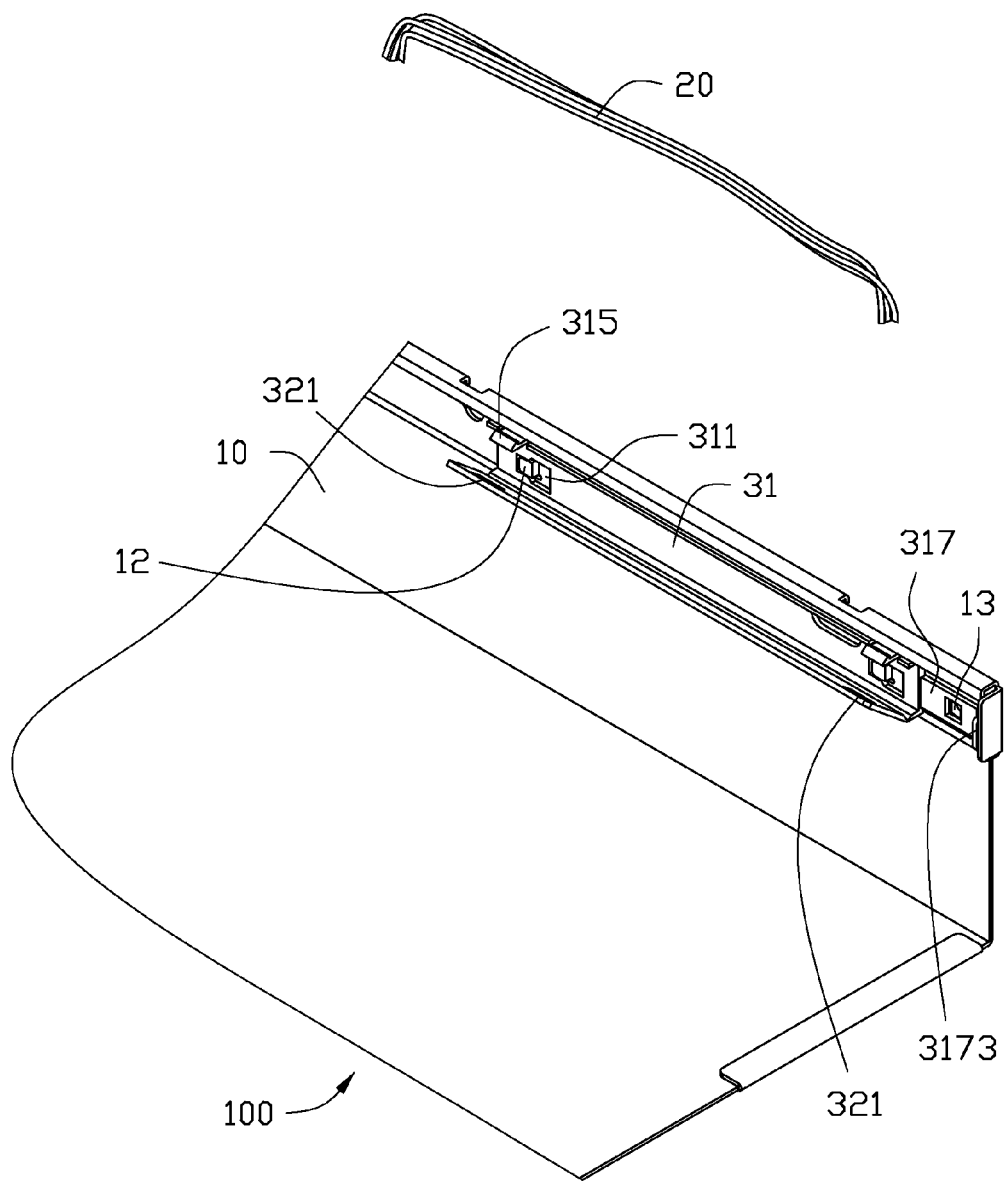
FIG. 4 is similar to FIG. 3, but the cable management tray of the cable management apparatus is located in a second position.

Referring to FIGS. 3 and 4, in assembly, the base 31 is received in the accommodating space 40. The two clipping pieces 12 are inserted into the two through holes 311. The positioning piece 3173 abuts the block 13. The cable management tray 30 is pushed in a first direction substantially parallel to the securing board 10 and towards to the second flange 116. The positioning piece 3173 is deformable and passed through the block 13. The cable management tray 30 is further pushed, until the block 13 is engaged into the securing hole 3171, the two clipping pieces 12 are engaged with the two receiving portions 312. The positioning piece 3173 abuts the second flange 116, therefore, the cable management tray 30 is secured to the securing arm 112.

When the cable 20 needs to be received in the cable management tray 30, the cable 20 is received in the space 50. The door 32 is rotated to the first position, and the two hooks 315 are engaged into the two clasping holes 321. In one embodiment, an extending direction of the cable 20 is substantially parallel to the base 31.

When the cable 20 needs to be taken out of the cable management tray 30. The door 32 is rotated to the second position, and the two hooks 315 are disengaged from the two clasping holes 321. Therefore, the cable 20 can be taken out of the space 50.

When the cable management tray 30 needs to be detached from the securing board 10, the cable management tray 30 is pulled to disengage the block 13 from the securing hole 3171. The cable management tray 30 is pulled in a second direction opposite to the first direction, until the two clipping pieces 12 are removed from the two receiving portions 312 and further clearance through the two through holes 311. Therefore, the cable management tray 30 can be detached from the securing board 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable management apparatus, comprising:
a securing board comprising a securing arm, and the securing arm extends from the securing board; and
a cable management tray located on the securing arm and substantially parallel to the securing board, the cable management tray comprising a base and a door rotatably secured to the base; a hook located on the base; and a clasping hole defined in the door; wherein the base comprising a plane substantially parallel to the securing board, and an extending direction of the hook substantially perpendicular to the plane of the base;
wherein the door is rotatable relative to the base between a first position and a second position; in the first position, the hook is engaged in the clasping hole and secures the door to the base, which prevents the door from rotating relative to the base, the base and the door together define a space, and a cable is received in the space in a direction substantially parallel to the plane; in the second position, the hook is removed from the clasping hole to disengage the cable from the space, and the door is rotatable relative to the base; and a clipping piece extends towards the inside of the securing arm, a through hole is defined in the base, and the through hole is adapted to allow the clipping piece to pass through the securing arm.

2. The cable management apparatus of claim 1, wherein the door is substantially parallel to the plane when in the first position.

3. The cable management apparatus of claim 1, wherein a connecting flange connected to the securing arm and extends towards outside of the securing board, a first flange extends from the securing arm and towards inside of the securing board; the connecting flange, the securing arm and the first flange together define an accommodating space, and the cable management tray is received in the accommodating space.

4. The cable management apparatus of claim 3, wherein the connecting flange is substantially perpendicular to the securing board.

5. The cable management apparatus of claim 3, wherein a second flange is further connected to the securing arm, an extending panel extends from the base and comprises a positioning piece, and the positioning piece abuts the second flange.

6. The cable management apparatus of claim 5, wherein a securing hole is defined in the extending panel, and a block is located on the securing arm and engaged in the securing hole.

7. The cable management apparatus of claim 1, wherein a receiving portion communicates with the through hole, and the clipping piece is received in the receiving portion.

8. The cable management apparatus of claim 1, wherein the clipping piece is L-shaped and back to the second flange.

9. A cable management apparatus, comprising:
a securing board; a connecting flange extending towards an outside of the securing board, a securing arm extending from the connecting flange, and a first flange connected to the securing arm and extending towards an inside of the securing board; the connecting flange, the securing arm and the first flange together define an accommodating space; and
a cable management tray received in the accommodating space and attached to the securing arm; the cable management tray comprising a base and a door rotatably secured to the base; wherein the base comprising a plane substantially parallel to the securing board, and a space defined between the base and the door to receive a cable;
wherein an extending direction of the cable received in the space is substantially parallel to the plane, and the door is rotatable from the base to remove the cable from the space; a clipping piece extends towards inside of the securing arm, a through hole is defined in the base, and the through hole is adapted to allow the clipping piece to pass through the securing arm.

10. The cable management apparatus of claim 9, wherein a clasping hole is defined in the door, a hook is located on the base and received in the clasping hole.

11. The cable management apparatus of claim 10, wherein the hook extends a top edge of the base and substantially perpendicular to the plane.

12. The cable management apparatus of claim 9, wherein the connecting flange is substantially perpendicular to the securing board.

13. The cable management apparatus of claim 9, wherein a second flange is further connected to the securing arm, an extending panel extends from the base and comprises a positioning piece, and the positioning piece abuts the second flange.

14. The cable management apparatus of claim 13, wherein a securing hole is defined in the extending panel, and a block is located on the securing arm and engaged in the securing hole.

15. The cable management apparatus of claim 9, wherein a receiving portion communicates with the through hole, and the clipping piece is received in the receiving portion.

16. The cable management apparatus of claim 9, wherein the clipping piece is L-shaped.

* * * * *